US012468465B2

(12) United States Patent
Bert et al.

(10) Patent No.: US 12,468,465 B2
(45) Date of Patent: Nov. 11, 2025

(54) PROCESSING WRITE REQUESTS BASED ON QUEUE IDENTIFIER

(71) Applicant: Micron Technology, Inc., Boise, ID (US)

(72) Inventors: Luca Bert, San Jose, CA (US); Sampath Ratnam, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/770,896

(22) Filed: Jul. 12, 2024

(65) Prior Publication Data

US 2025/0021253 A1    Jan. 16, 2025

Related U.S. Application Data

(60) Provisional application No. 63/526,509, filed on Jul. 13, 2023.

(51) Int. Cl.
*G06F 3/06* (2006.01)
(52) U.S. Cl.
CPC ............ *G06F 3/064* (2013.01); *G06F 3/0604* (2013.01); *G06F 3/0673* (2013.01)
(58) Field of Classification Search
CPC ...... G06F 3/064; G06F 3/0604; G06F 3/0673; G06F 3/061; G06F 3/0659; G06F 3/0679; G06F 3/0688
See application file for complete search history.

(56) References Cited

U.S. PATENT DOCUMENTS

| 2019/0146684 A1* | 5/2019 | Benisty | G06F 13/4282 |
| | | | 711/102 |
| 2021/0255801 A1* | 8/2021 | Jang | G06F 3/0659 |
| 2022/0311716 A1 | 9/2022 | Dutta | |

FOREIGN PATENT DOCUMENTS

| KR | 20210148852 | 12/2021 |
| WO | 2019172971 | 9/2019 |

OTHER PUBLICATIONS

"International Application Serial No. PCT US2024 037913, International Search Report mailed Nov. 6, 2024", 3 pgs.
"International Application Serial No. PCT US2024 037913, Written Opinion mailed Nov. 6, 2024", 4 pgs.

* cited by examiner

*Primary Examiner* — Francisco A Grullon
(74) *Attorney, Agent, or Firm* — Schwegman Lundberg & Woessner, P.A.

(57) ABSTRACT

Various embodiments provide for processing write requests on a memory system based on queue identifiers associated with the write requests. In particular, input data streams can be received and stored by submission queues of a memory system, and write requests in the input data streams can be separated and processed based on queue identifiers associated with the submission queues using an inline approach for writing data on the memory system, an offline approach for writing data on the memory system, or both.

20 Claims, 7 Drawing Sheets

PROCESSING WRITE REQUESTS BASED ON QUEUE IDENTIFIER

PRIORITY APPLICATION

This application claims the benefit of priority to U.S. Provisional Application Ser. No. 63/526,509, filed Jul. 13, 2023, which is incorporated herein by reference in its entirety.

TECHNICAL FIELD

Embodiments of the disclosure relate generally to memory devices and, more specifically, to processing write requests on a memory system based on queue identifiers associated with the write requests.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
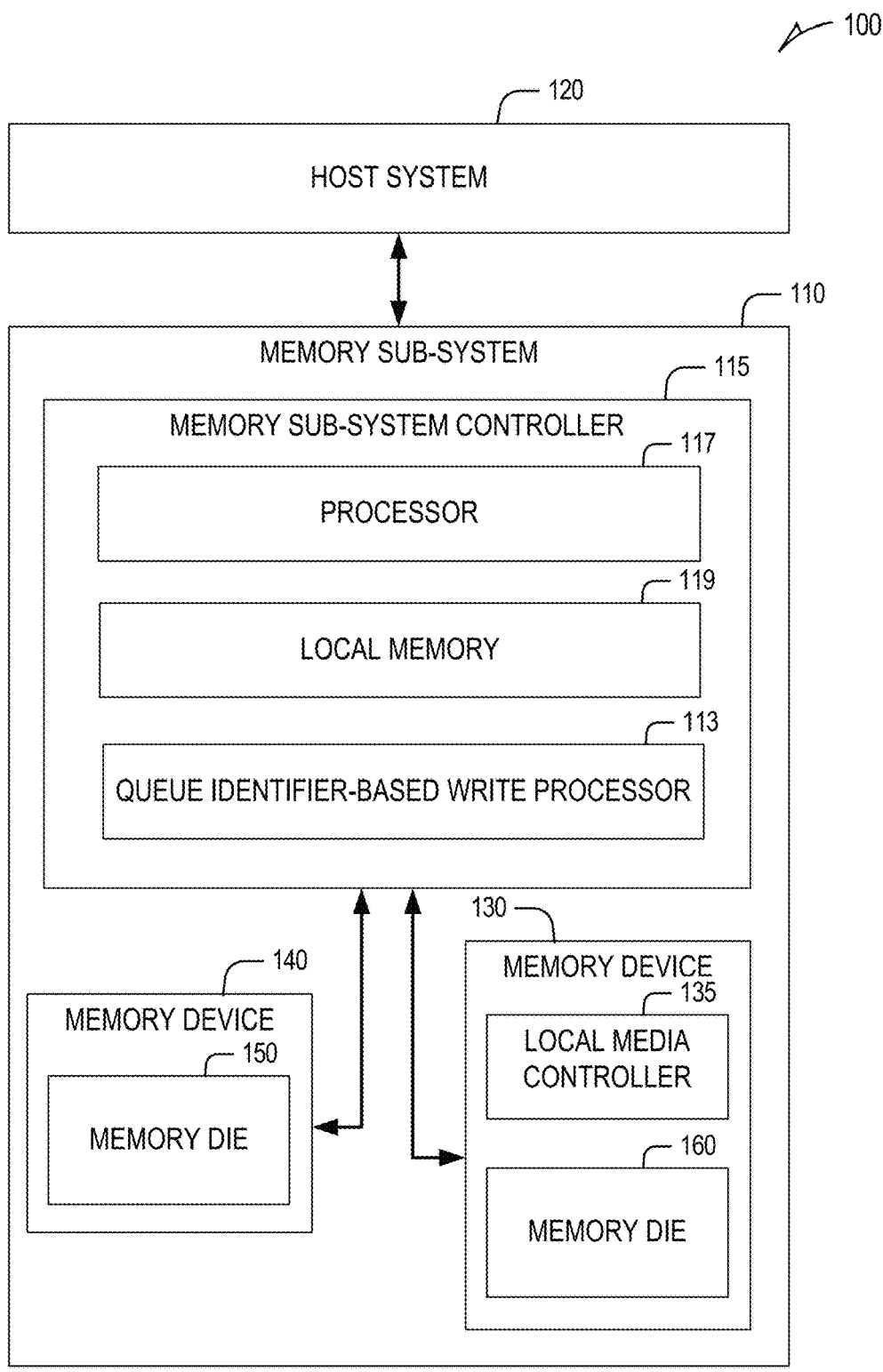
FIG. 1 is a block diagram illustrating an example computing system that includes a memory sub-system, in accordance with some embodiments of the present disclosure.

Aspects of the present disclosure are directed to processing write requests on a memory system (e.g., a memory sub-system) based on queue identifiers associated with the write requests. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write commands, read commands) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request (e.g., data access request or command request), is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., error-correcting code (ECC) codeword, parity code), data version (e.g., used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system can re-write previously written host data from a location of a memory device to a new location as part of garbage collection management operations. The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical memory address mapping table (also referred to herein as a L2P table), data from logging, scratch pad data, and so forth).

In general, garbage collection (GC) comprises an operation to manage memory utilization in a NAND-type memory device. When free storage space in the NAND-type memory device gets low, GC can recover free storage space on the NAND-type memory device to allow for new host data to be written. During GC, a block of the NAND-type memory device that contains pages (or sections of pages) with valid data and pages with stale/invalid data (e.g., garbage) is read. Pages (or section of pages) of the block with the valid data are preserved, by writing the valid data to a free (e.g., a fresh or erased) block of the NAND-type memory device at a new physical memory location (thereby relocating the valid data to the new location). Additionally, the logical block address (LBA) for the valid data is updated with the new physical memory location. The free block can be selected from a free block pool. Pages with stale/invalid data are marked for deletion and remain in the (old) block. After all valid data are relocated from the old block, the entire old block (that comprises pages with the stale/invalid data) is erased, and the erased block can be added to the free block pool and used for a new incoming data write. Such data written to pages and block erasure can lead to write amplification (WA). A numerical WA metric can be determined using a ratio of the amount of data physically written to the NAND-type memory (e.g., physical writes) to the amount of data a host system originally intended to write (e.g., write requests from a host system). The actual physical writes are generally larger than the write requests from the host system, resulting in a WA metric greater than one.

A memory device can be a non-volatile memory device. A non-volatile memory device is a package of one or more die. Each die can be comprised of one or more planes. For some types of non-volatile memory devices (e.g., NOT-AND (NAND)-type devices), each plane is comprised of a set of physical blocks. For some memory devices, blocks are the smallest area that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are raw memory devices combined with a local embedded controller for memory management within the same memory device package.

Certain memory devices, such as NAND-type memory devices, comprise one or more blocks, (e.g., multiple blocks) with each of those blocks comprising multiple memory cells. For instance, a memory device can comprise multiple pages (also referred as wordlines), with each page comprising a subset of memory cells of the memory device. A memory device can comprise one or more cache blocks and one or more non-cache blocks, where data written to the memory device is first written to one or more cache blocks, which can facilitate faster write performance; data stored on the cache blocks can eventually be moved (e.g., copied) to one or more non-cache blocks at another time (e.g., performing a block compaction operation at a time when the memory device is idle), which can facilitate higher storage capacity on the memory device. A cache block can comprise a single-level cell (SLC) block that comprises multiple SLCs, and a non-cache block can comprise a multi-level cell (MLC) block that comprises multiple MLCs, a triple-level cell (TLC) block that comprise multiple TLCs, or a quad-level cell (QLC) block that comprises QLCs. Writing first to one or more SLCs blocks can be referred to as SLC write caching. Generally, writing data to such memory devices involves programming (by way of a program operation) the memory devices at the page level of a block, and erasing dat from such memory devices involves erasing the memory devices at the block level (e.g., page level erasure of data is not possible).

A compaction (or a garbage collection) operation can be performed with respect to a cache block (containing one or more memory cells) of a memory device (e.g., NAND-type memory device), where the data stored in the cache block is copied (e.g., transferred) to a non-cache block. A compaction operation can be performed with respect to a set of cache blocks when, for instance, there are no available cache blocks to cache new data (e.g., cache new written data). As used herein, a block compaction operation is performed on a cache block and can comprise reading data stored on the cache block and writing the read data to a non-cache block (e.g., programming the non-cache block with the data read from the cache block), thereby copying the data from the cache block to the non-cache block An example block compaction operation can include a SLC-QLC block compaction operation. A block compaction operation can be performed, for instance, when available cache blocks on a memory device are full or nearing a fill limit.

For conventional memory devices that comprise NOT-AND (NAND) memory cells (hereafter referred to as NAND-type memory devices), writing and erasing sequentially generally leads to lower or reduced write amplification (e.g., a low write amplification factor (WAF)) and better data performance. While modern software on host systems (e.g., software applications, databases, and file systems) tend to read and write data sequentially with respect to a memory system (e.g., a memory sub-system coupled to a host system), when such software is executed by one or more multicore hardware processors of the host system, the sequentiality of data access request (e.g., read and write requests) to the memory system is usually lost. For instance, when modern software operates on one or more multicore hardware processors of a host system, a block layer of the host system typically divides work to be performed by each process (of the software) among two or more cores of a multicore hardware processor (e.g., in a way where work is uniformly divided across cores to achieve maximum throughput). While each core of a host system's hardware processor may still issue largely sequential data access requests to a memory system, the data access requests are usually intermingled (e.g., interleaved) with each other and appear random or pseudo-random from the perspective of the memory system. This can be due to data aggregation and request priority policy in a data link layer between the host system and the memory system. For instance, a memory system having a Non-Volatile Memory Express (NVMe) architecture is typically designed to have an out-of-order traffic handshake between the host system and a controller of the memory system for data performance reasons.

Aspects of the present disclosure are directed to processing write requests on a memory system (e.g., a memory sub-system) based on queue identifiers associated with the write requests. In particular, input data streams can be stored on submission queues of a memory system, and write requests in the input data streams can be separated and processed based on queue identifiers associated with the submission queues using an inline approach for writing data on the memory system (e.g., to media thereof), an offline approach for writing data on the memory system (e.g., to media thereof), or both. Memory systems of various embodiments described herein leverage queue identifiers included by write requests, and leverage the submission queues (associated with queue identifiers) that receive the write requests, to detect sequentiality and data input/output (I/O) locality in write requests from a host system.

The architecture of conventional memory systems, such as those implemented by a NVMe standard, include multiple queues for processing data access requests (e.g., read and write requests) from host systems. For instance, a memory system based on a NVMe standard can comprise multiple pairs of queues, where each queue pair is associated with a different queue identifier (QID), and where each queue pair comprises a submission queue for incoming requests that need to be completed/processed and a completion queue for command requests already completed/processed by the memory system. As herein, a submission queue identifier (SQID) can refer to a submission queue of a given queue pair, and can be equal to the QID of the given queue pair. A QID can be included as a parameter (e.g., QID tag) in a data access request from a host system to a memory system, and can serve as a pointer to a submission queue on the memory system that is to receive the data access request. Generally, each core of a host system's hardware processor is individually associated with (e.g., assigned to, mapped to, attached to) a different QID (e.g., different queue pair on the memory system having a unique QID), and data access requests (e.g., read and write requests) from a given core are received and stored by a submission queue that has a queue identifier associated with the given core. Additionally, a given thread executing on a host system (e.g., of a software application or a database on the host system) tends to be started/run on the same core of the host system's hardware processor (e.g., threads on the host system tend to have core affinity). A given core of a host system's hardware processor can have multiple threads (e.g., four to five threads) that operate on and have affinity to the given core.

Given that a select thread tends to issue data access requests with sequentiality, that the select thread has an affinity to a select core of a host system's hardware processor, and the select core is associated with a select submission queue of a memory system that has a select queue identifier, memory systems of various embodiments can use a queue identifier of a submission queue as a proxy for identifying one or more threads, each of which tends to generate or issue data access requests sequentially. By identifying one or more threads using queue identifiers, memory systems of various embodiments can detect sequentiality of data access requests (of those one or more threads) based on queue identifiers and can process the data access requests in such a way that maintains at least some level of sequentiality of data access requests (e.g., read or write request). For example, some embodiments described herein operate on a premise that write requests, generated by one or more threads operating on a given hardware processor core and stored in a given submission queue of a memory system, are likely correlated in a time span of interest (e.g., a time span that covers a page stripe length or a few seconds).

The following details an example inline approach for writing data on the memory system (e.g., to media thereof) based on queue identifiers. According to various embodiments, write requests are received at a memory system, from a host system, via one or more submission queues of the memory system, where a submission queue associated with a specific queue identifier receives write requests having the same specific queue identifier. When scanning each submission queue for a next data access request, the memory system of some embodiments causes any read requests encountered to start immediate processing (e.g., executing, command merging, or staged execution) by the memory system and causes any write requests encountered to be parked for deferred processing (e.g., execution) at a later time by the memory system. For instance, for a write request from a submission queue having a specific queue identifier, a memory system of an embodiment can park the write request for deferred processing (e.g., execution) by adding the write request to a specific list of parked write requests, where the specific list is associated with the specific queue identifier (e.g., write_park[QID] lists). For some embodiments, a memory system maintains a separate list of parked write requests for each queue identifier. When a monitored time (e.g., a timer) associated with a given list of parked write requests (for a QID) has expired or when a number of write request in the given list of parked write requests surpasses a threshold number (e.g., a predetermined number of write requests, such as eight write requests), a memory system can cause at least some (e.g., all) of the write requests in the given list of parked write requests to start immediate processing (e.g., execution, executing, command merging, or staged execution) by the memory system. According to some embodiments, the expectation is that write requests in the given list of parked writer requests are highly sequential (e.g., based on core affinity of threads and individual queue identifiers being associated with individual hardware processor cores) and so those write request can be coalesced into a larger sequential write. For example, with respect to data access requests received and stored by a given submission queue associated with a given queue identifier, an embodiment described herein can cause a memory system to park write requests (e.g., write commands) for deferred processing and coalesce those write requests to single sequential write of a larger average size (e.g., ~6000 logic block addresses (LBAs)) than not parking write requests for deferred execution (e.g., which can result in write requests of a smaller average size, such as 700 LBAs). With larger sequential writes based on lists of parked write requests, cursor granularity on a memory system can be rendered coarser, and the workload (e.g., the number of number of I/O operations) performed during garbage collection can be reduced.

The following details an example offline approach for writing data on the memory system (e.g., to media thereof) based on queue identifiers. According to various embodiments, write requests are received at a memory system, from a host system, via one or more submission queues of the memory system, where a submission queue associated with a specific queue identifier receives write requests having the same specific queue identifier. Eventually, when a given write request from a given submission queue is processed (e.g., either with the inline approach or without inline approach described herein), the given write request is processed such that an associated queue identifier (associated with the given submission queue/the given write request) is stored (e.g., as QID-tags) on the memory in association with data (e.g., host or user data) written to the a set of blocks on the memory system by the given write request. For instance, where data is written to a set of blocks in response to a write request from a submission queue, the data can include a queue identifier (e.g., SQID) associated with the write request or metadata associated with the set of blocks can include the queue identifier. In another instance, where data is written to a set of blocks in response to a write request from a submission queue, a queue identifier (e.g., SQID) associated with the write request can be stored in a separate stream or separate storage area of the memory system in association with the set of blocks. Eventually, when garbage collection is performed on one or more source blocks (e.g., of a source superblock) of the memory system, queue identifiers stored in association with those blocks can be used to sequentially organize (e.g., sequentially write) data of common queue identifiers in a set of destination blocks (e.g., of a destination superblock). In particular, a memory system of an embodiment can identify, in the one or more source blocks, a longest list of source memory units (e.g., pages or blocks) storing valid data and having common queue identifiers, and performing garbage collection on blocks of the longest list. For instance, data can be migrated from one or more pages of the longest list to a destination superblock (e.g., to pages stripes thereof) until the destination superblock is filled or the list is exhausted. Thereafter, if the superblock is not full, a next longest list of source memory units (e.g., pages or blocks) storing valid data and having common queue identifiers is identified, and data can be migrated from one or more memory units of the next longest list to the destination superblock (e.g., to page stripes thereof) until the destination superblock is filled or the list is exhausted. This can be repeated until the destination superblock is filled. By performing garbage collection based on queue identifiers as described herein, various embodiments can increase the chances that when migrated valid data is eventually erased, the entire collection of destination memory units that received the migrated valid data (e.g., the entire destination superblock) will be erased at the same time, thereby resulting in improved performance and lower garbage collection overhead.

Overall, the use of various embodiments described herein result in larger sequential storage (e.g., organization) of data, having common queue identifiers, on a memory system. In other words, various embodiments can organize data on a memory system conditioned upon queue identifiers (e.g., SQID) and, in doing so, can protect data sequentially provided by submission queues. The sequential storage (e.g., organization) of data having common queue identifiers can result in lower write amplification, higher performance of the memory system, higher performance per a unit of power (e.g., watt), or some combination thereof.

Data access request and command request are used interchangeably herein. As used herein, a data access request/command request can comprise a data access command for a memory system. Accordingly, a write request can comprise a write command for a memory system, and a read request can comprise a read command for a memory system.

As used herein, a superblock of a memory device (e.g., of a memory system) comprises a plurality (e.g., collection or grouping) of blocks of the memory device. For example, a superblock of a NAND-type memory device can comprise a plurality of blocks that share a same position in each plane in each NAND-type memory die of the NAND-type memory device.

Disclosed herein are some examples of processing write requests on a memory system based on queue identifiers associated with the write requests, as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a SATA interface, a peripheral component interconnect express (PCIe) interface, USB interface, Fibre Channel, Serial Attached SCSI (SAS), Small Computer System Interface (SCSI), a double data rate (DDR) memory bus, a DIMM interface (e.g., DIMM socket interface that supports DDR), Open NAND Flash Interface (ONFI), DDR, Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random-access memory (SDRAM).

Some examples of non-volatile memory devices (e.g., memory device 130) include a NAND type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional (2D) NAND and 3D NAND.

Each of the memory devices 130 can include one or more arrays of memory cells. One type of memory cell, for example, SLCs, can store one bit per cell. Other types of memory cells, such as MLCs, TLCs, QLCs, and penta-level cells (PLCs), can store multiple or fractional bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

As used herein, a block comprising SLCs can be referred to as a SLC block, a block comprising MLCs can be referred to as a MLC block, a block comprising TLCs can be referred to as a TLC block, and a block comprising QLCs can be referred to as a QLC block.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands, requests, or operations from the host system 120 and can convert the commands, requests, or operations into instructions or appropriate commands to achieve the desired access to the memory devices 130 and/or the memory device 140. The memory sub-system controller 115 can be responsible for other operations such as wear leveling operations, garbage collection operations, error detection and ECC operations, encryption operations, caching operations, and address translations between a logical address (e.g., LBA, namespace) and a physical memory address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

Each of the memory devices 130, 140 include a memory die 150, 160. For some embodiments, each of the memory devices 130, 140 represents a memory device that comprises a printed circuit board, upon which its respective memory die 150, 160 is solder mounted.

The memory sub-system controller 115 includes a queue identifier-based write processor 113 that enables or facilitates the memory sub-system controller 115 to process write requests based on queue identifiers associated with the write requests as described herein. For some embodiments, the queue identifier-based write processor 113 can be part of a larger queue identifier-based request processor (not shown). Alternatively, some or all of the queue identifier-based write processor 113 is included by the local media controller 135, thereby enabling the local media controller 135 to enable or facilitate processing of write requests based on queue identifiers associated with the write requests as described herein.

Figure 2:
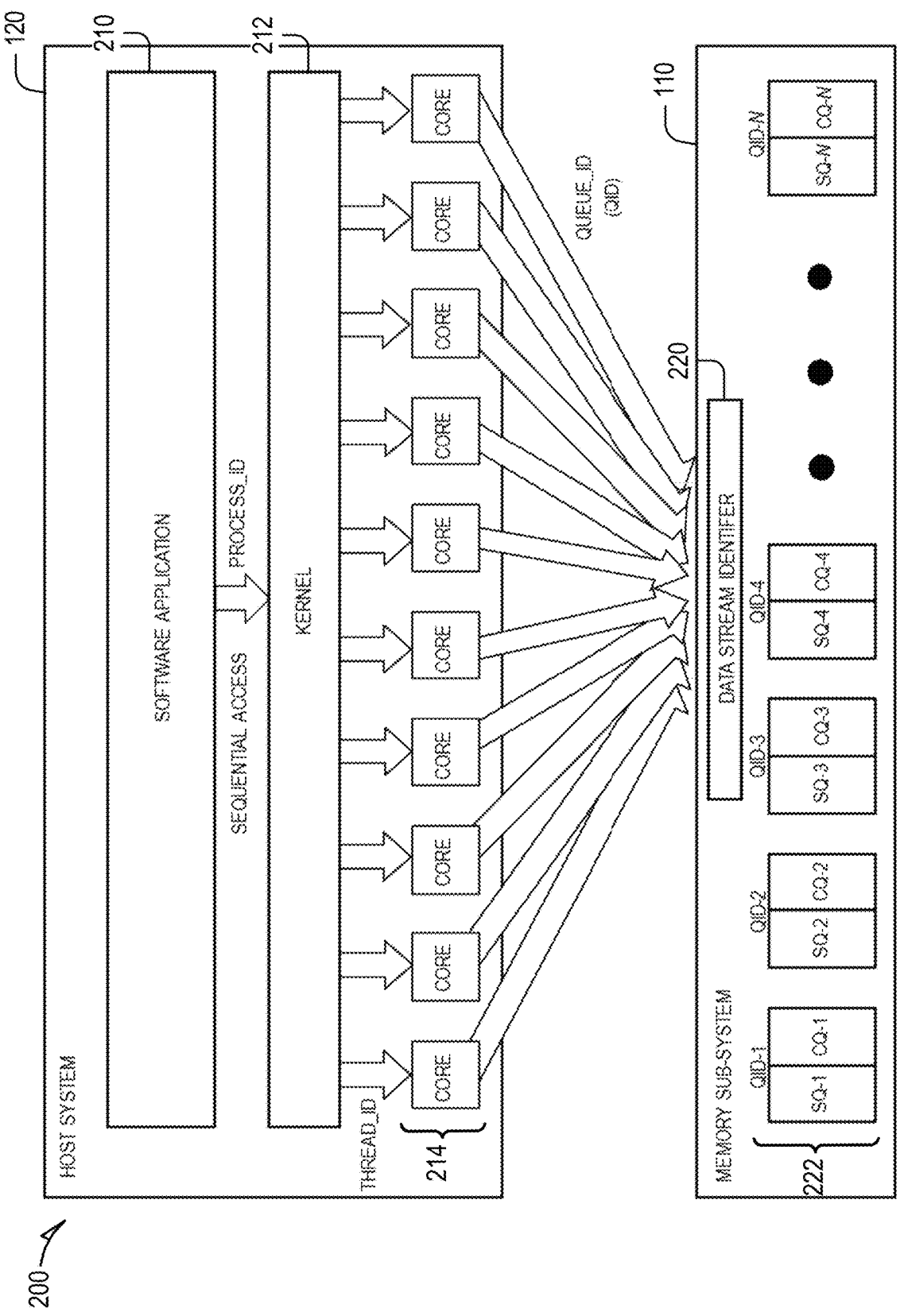
FIG. 2 is a diagram illustrating an example architecture of a host system and a memory sub-system, in accordance with some embodiments of the present disclosure.

FIG. 2 is a diagram illustrating an example architecture 200 of the host system 120 and the memory sub-system 110 of FIG. 1, in accordance with some embodiments of the present disclosure. In the example architecture 200, the host system 120 comprises multiple hardware processor cores 214, a software application 210 operating on the multiple hardware processor cores 214, and a kernel 212 (e.g., of an operating system) operating on the multiple hardware processor cores 214. Additionally, in the example architecture 200, the memory sub-system 110 comprises a data stream identifier 220 (e.g., which is part of a queue identifier-based request processor) and multiple pairs of queues 222, which include queues pairs associated with queue identifier-1 (QID-1) through queue identifier-N (QID-N). The queue pair associated with queue identifier-1 (QID-1) comprises a submission queue 1 (SQ-1) and a completion queue (CQ-1), the queue pair associated with queue identifier-2 (QID-2) comprises a submission queue-2 (SQ-2) and a completion queue (CQ-2), the queue pair associated with queue identifier-3 (QID-3) comprises a submission queue-3 (SQ-3) and a completion queue (CQ-3), the queue pair associated with queue identifier-4 (QID-4) comprises a submission queue-4 (SQ-4) and a completion queue (CQ-4), and so on. During operation, the software application 210 can cause execution of processes (having process identifiers (PROCESS_IDs)) by the kernel 212, where one or more of the processes can involve generation of sequential data access requests. The kernel 212 can execute at least one of the processes by dividing the process into multiple threads (each having a thread identifier (THREAD_ID)) to be executed by the multiple hardware processor cores 214. Each of the threads can be assigned for execution by one of the multiple hardware processor cores 214 (e.g., according to core affinity), and execution of a thread by a given hardware processor core can cause the given hardware processor core to generate and issue one or more data access requests to the memory sub-system 110, where each generated/issued data access request includes a queue identifier (QID) of the given hardware processor core.

As data access requests are generated and issued by the multiple hardware processor cores 214, the data access requests from each hardware processor core can be interleaved with those generated and issued by one or more other hardware processor cores. Accordingly, the data access request received by the memory sub-system 110 can appear random or pseudo-random to the memory sub-system 110.

Upon receiving a given data access request, the memory sub-system 110 can use the data stream identifier 220 to determine a given queue identifier of the given data access request, and the memory sub-system 110 can cause the given data access request to be stored in a submission queue (e.g., stored to an entry added to the submission queue) of the queue pair (of the multiple pairs of queues 222) that corresponds to (e.g., matches) the given queue identifier. When the given data access request has been processed (e.g., executed) by the memory sub-system 110, the results of the given data access request can be stored (e.g., queued) to a completion queue (e.g., stored to an entry added to the completion queue) of the queue pair (of the multiple pairs of queues 222) that corresponds to (e.g., matches) the given queue identifier, from which the host system 120 can obtain (e.g., collect) the results.

Figure 3:
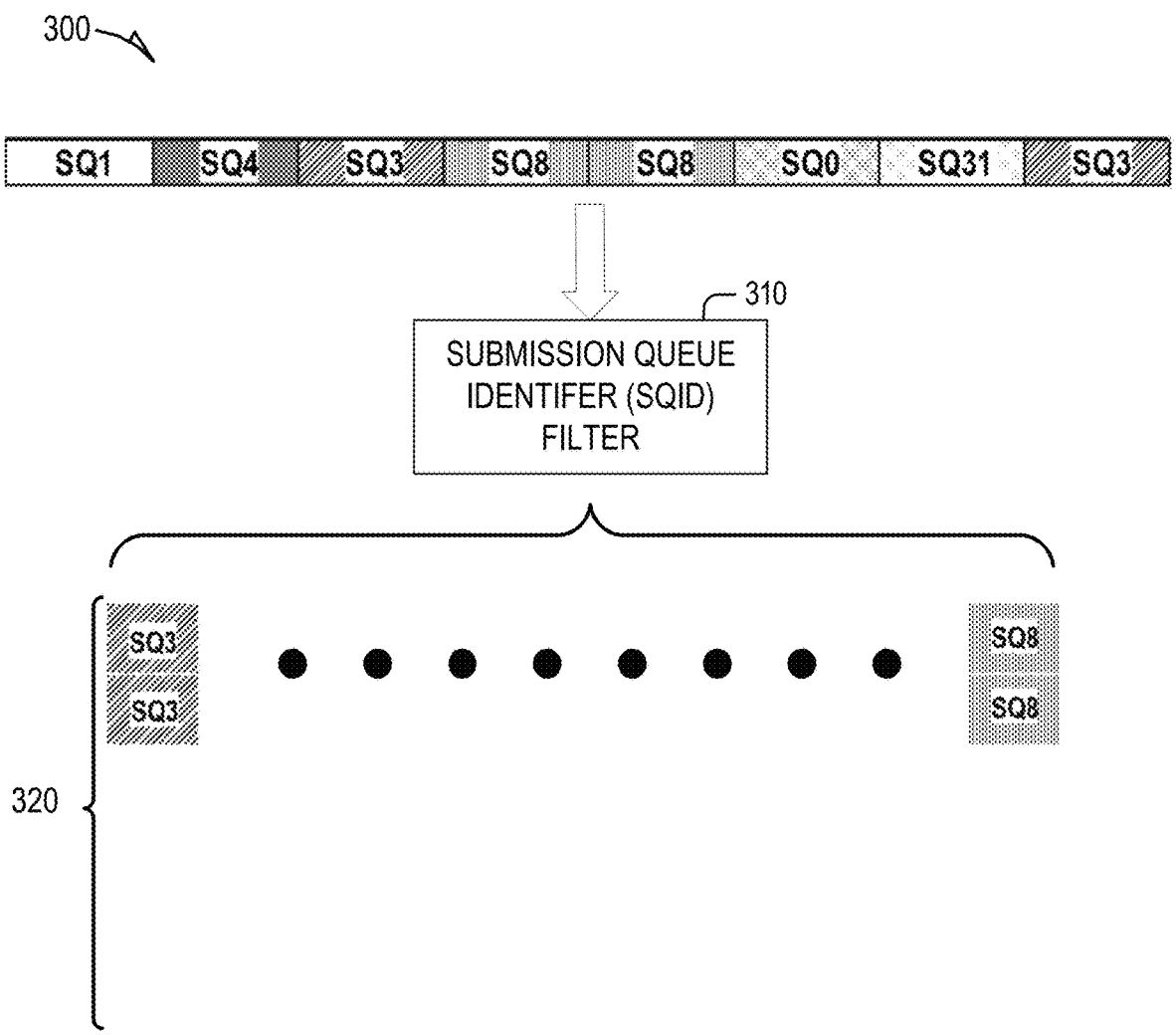
FIG. 3 illustrates an example of filtering requests of an example write data stream, in accordance with some embodiments of the present disclosure.

FIG. 3 illustrates an example of filtering requests of an example request data stream 300, in accordance with some embodiments of the present disclosure. In particular, the request data stream 300 comprises a random or pseudo random stream of requests (e.g., write requests and read requests) that each have a queue identifier (e.g., SQ1, SQ4, SQ3, SQ8, SQ0, and SQ31) associated with (e.g., corresponding to) a submission queue of a memory system. According to some embodiments, a memory system (e.g., the memory sub-system 110) includes a submission queue identifier (SQID) filter 310 (e.g., which is part of the queue identifier-based write processor 113), which can be configured to apply SQID-based filter on the request data stream 300 to filter/break down the request data stream 300 into sequential write streams 320, each of which represents a collection of write requests that have a common queue identifier and that can be coalesced into one or more larger write requests. Depending on the embodiment, each of the sequential write streams 320 can be written (e.g., mapped) to a set of blocks of a memory device (e.g., 130, 140) of the memory system (e.g., the memory sub-system 110) using one or more different sequential data configurations (e.g., organizational arrangements). For instance, one of the sequential write streams 320 can be written to a NAND-type memory device of the memory system on a stripe (e.g., page stripe of a superblock) basis, a superblock basis, on a physical-to-logical (P2L) layer basis, or a 1/Nth deck basis (e.g., half block basis).

Figure 4:
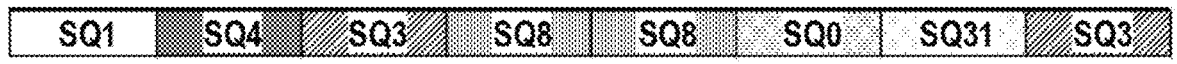
FIG. 4 illustrates example garbage collection operations of superblocks, in accordance with some embodiments of the present disclosure.
Figure 4:
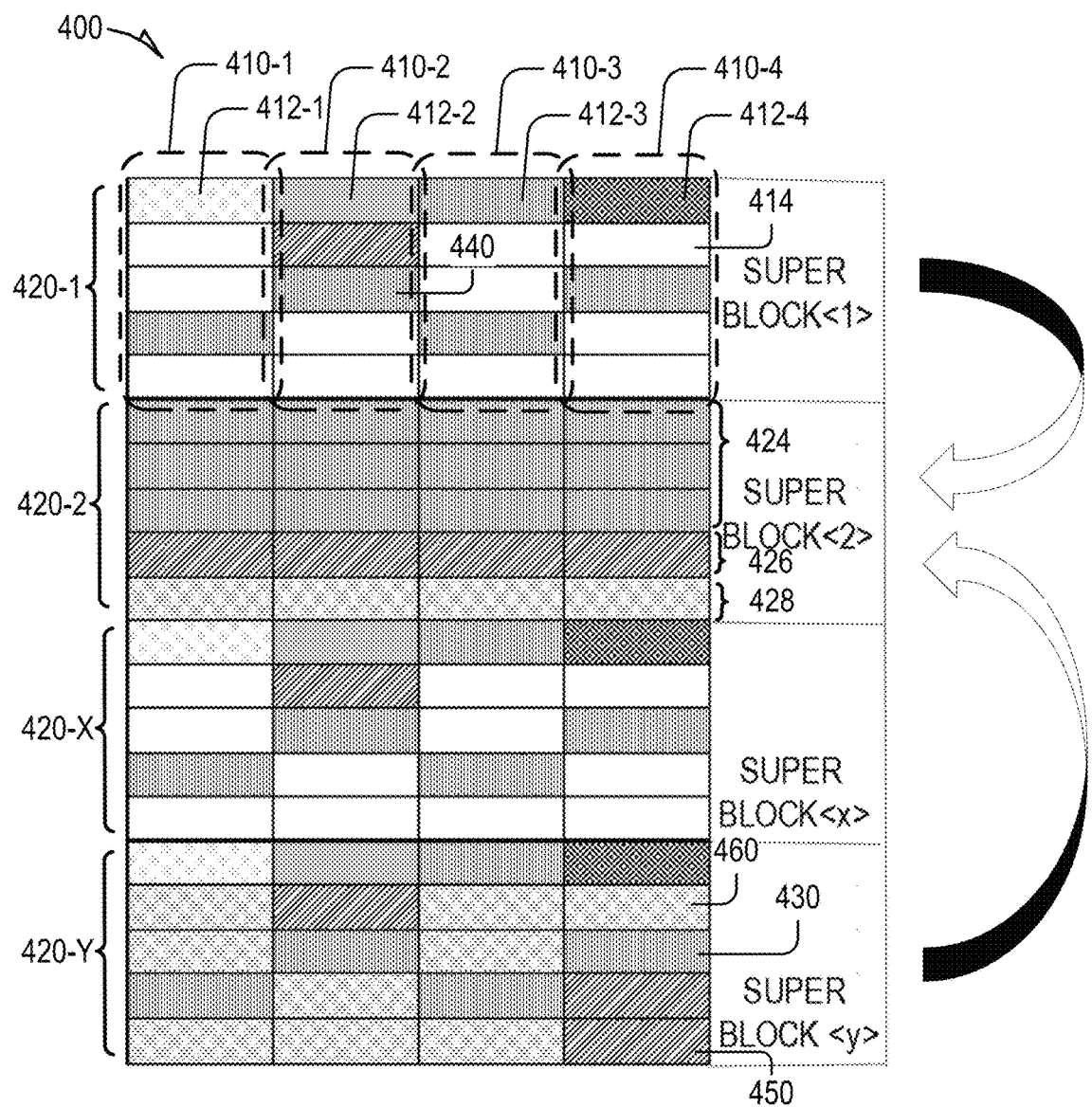

FIG. 4 illustrates example garbage collection operations 400 of superblocks, in accordance with some embodiments of the present disclosure. Based on execution of one or more write request from the request data stream 300 (which comprises write requests that each have a queue identifier), one or more pages (e.g., pages 412-1, 412-2, 412-3, 412-4) of one or more blocks (e.g., blocks 410-1, 410-2, 410-3, 410-4) of superblocks 420-1, 420-2, 420-X, 420-Y can be written to with data (e.g., user data, host data). In FIG. 4, pages 412-1, 412-2, 412-3, 412-4 illustrate an example of a page stripe of superblock 420-1, where the page stripe spans across blocks 410-1, 410-2, 410-3, 410-4 of superblock 420-1. Blank pages, such as page 414, represent pages that are empty, or that are storing invalid data (e.g., and marked for deletion). For some embodiments, write request from a request data stream (e.g., 300) is filtered based on queue identifier (e.g., SQID) to filter/break down the write data stream into one or more sequential write streams (e.g., 302), each of which represents a collection of write requests having a common queue identifier. For various embodiments, each sequential write stream can be written to a memory device (e.g., NAND-type memory device) in a sequential data configuration, such as page stripe basis, superblock basis, P2L granularity basis, etc.). An example page stripe basis writing of a sequential write stream is illustrated by page stripes 424 of the superblock 420-2.

According to various embodiment, as a single write request is processed (e.g., executed) by a memory system (e.g., the memory sub-system 110), data is written to one or more blocks of a memory device and the queue identifier of the single write is also stored on the memory device in association with the written data. For instance, the execution of a single write request associated with a queue identifier (e.g., SQID) of SQ4 can result in the writing of data to block 410-2 (of superblock 420-1) and storage of the queue identifier of SQ4 in association with the data written to block 410-2. Similarly, the execution of a single write request associated with a queue identifier of SQ8 can result in the writing of data to block 410-3 (of superblock 1) and storage of the queue identifier of SQ8 in association with the data written to block 410-3. Depending on the embodiment, the queue identifier of the single write request can be included in the written data, stored in metadata of the written data, or stored in a separate area of the memory device. When garbage collection is initiated (e.g., invoked) with respect to one or more superblocks, a list of memory units (e.g., pages or blocks) storing valid data is determined (e.g., generated) for each queue identifier applicable to the one or more superblocks (e.g., each queue identifier associated with at least one block in the one or more superblocks). From the one or more lists of memory units that result, a memory system of an embodiment can determine (e.g., identify) a longest list of memory units (e.g., the list with the most number of memory units) having a common identifier, and can start performing garbage collection on memory units of the longest list, during which valid data from those (source) memory units is migrated to other (destination) memory units that are fresh/available. For example, this is illustrated in FIG. 4, where a memory system can determine that the longest list of pages storing valid data is the list of pages (e.g., page 412-3 of superblock 420-1, and page 430 of superblock 420-Y) associated with a queue identifier of SQ8, and can perform garbage collection on pages of that list, thereby causing valid data from pages of superblocks 420-1 and 420-Y associated with the queue identifier of SQ8 to be migrated to page stripes 424 of superblock 420-2.

To determine the longest list of memory units, the memory system can rank the lists based on counts of memory units in each list. Additionally, if destination memory units are part of a collection of (destination) memory units (such as memory units of a superblock) and the collection of destination memory units has not been filled up, a next longest list of memory units can be determined (e.g., identified) from the one or more lists of memory units and the memory system can start performing garbage collection on memory units of the next longest list of memory units. Additionally, for some embodiments, the next longest list of memory units determined (e.g., identified) is a list comprising enough memory units to entirely fit the memory units that remain empty in the collection of destination memory units.

For example, in FIG. 4, the migration of valid data from pages associated with SQ8 did not fill superblock 420-2. As a result, a memory system can determine a next longest list of pages that can fit in the remaining page (e.g., page stripes) of superblock 420-2 is the list of pages (e.g., page 440 of superblock 420-1, and page 450 of superblock 420-Y) associated with a queue identifier of SQ3 (as opposed to list of pages associated with SQ0, which would not fit in the remaining pages). The memory system can perform garbage collection on pages of that next longest list, thereby causing valid data from pages of superblocks 420-1 and 420-Y associated with the queue identifier of SQ3 to be migrated to page stripe 426 of superblock 420-2. Again, because migration of valid data from pages associated with SQ3 still does not fill superblock 420-2, a memory system can determine a next longest list of pages that can fit in the remaining pages (e.g., page stripes) of superblock 420-2 is the list of pages (e.g., page 460 of superblock 420-Y) associated with a queue identifier of SQ0, and can perform garbage collection on pages of that next longest list, thereby causing valid data from pages of superblocks 420-Y associated with the queue identifier of SQ0 to be migrated to page stripe 428 of superblock 420-2.

Figure 5:
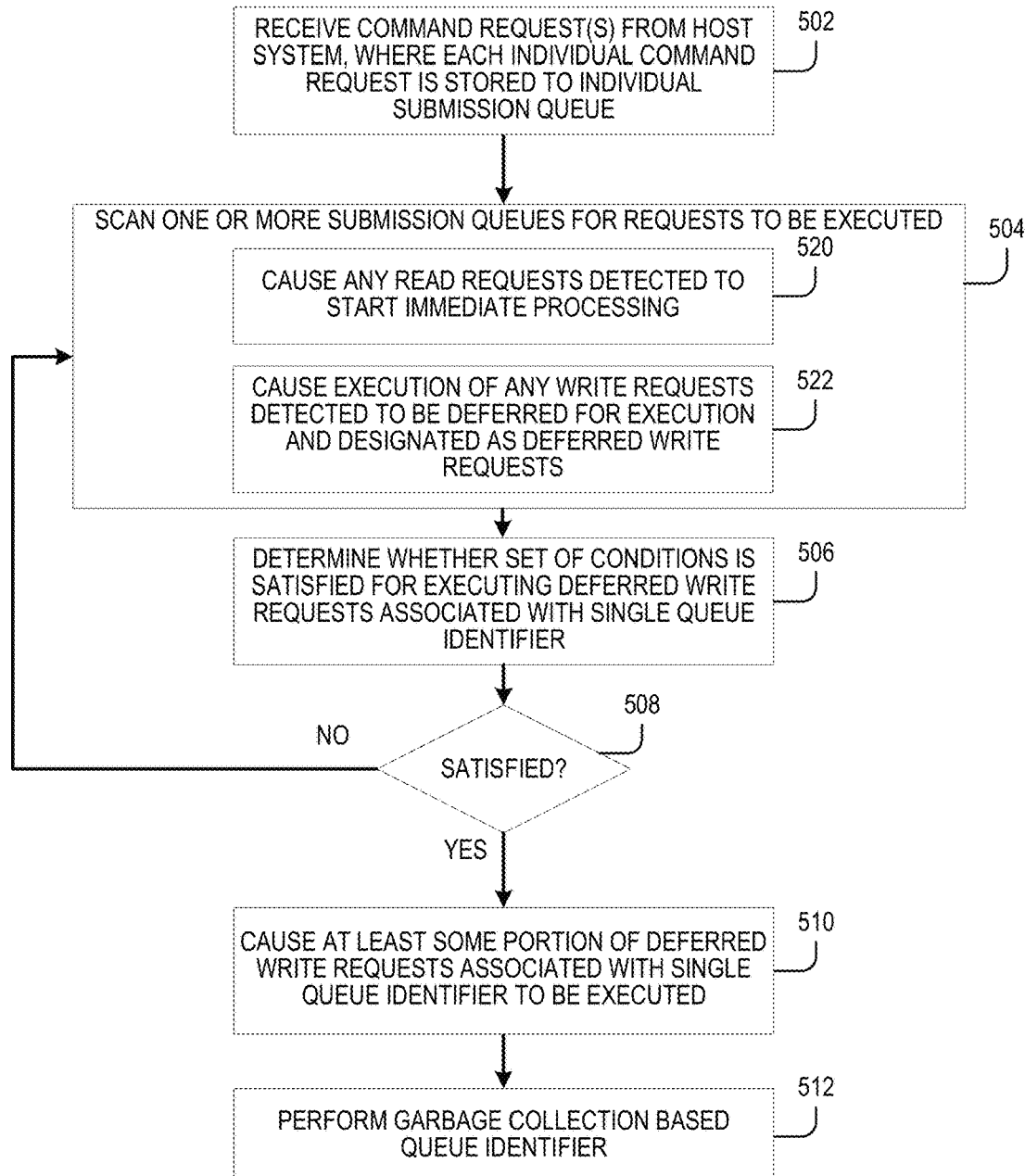
FIGS. 5 and 6 are flow diagrams of example methods for processing write requests on a memory system based on queue identifiers associated with the write requests, in accordance with some embodiments of the present disclosure.
Figure 6:
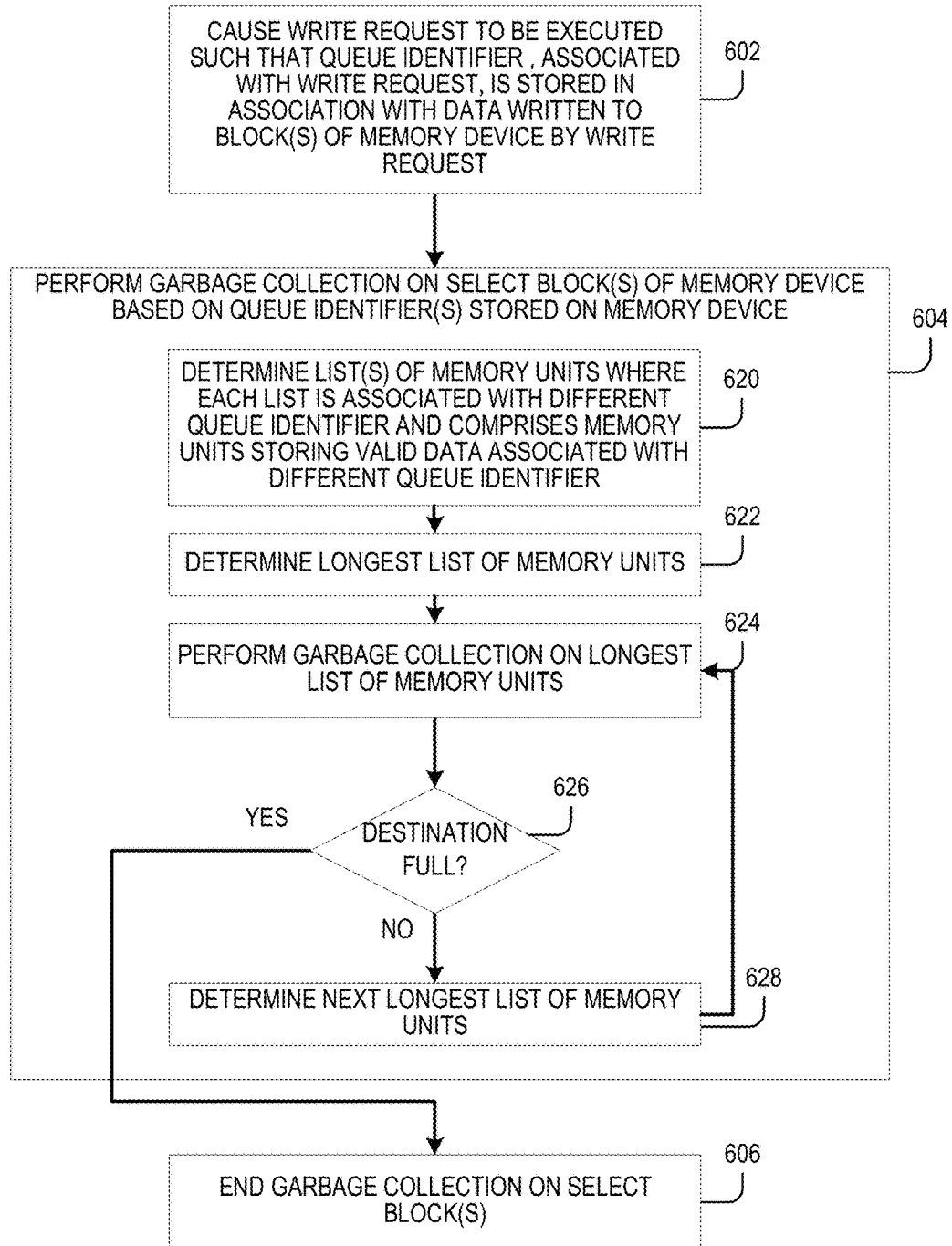

FIGS. 5 and 6 are flow diagrams of example methods 500, 600 for processing write requests on a memory system based on queue identifiers associated with the write requests, in accordance with some embodiments of the present disclosure. Any of methods 500, 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, at least one of the methods 500, 600 is performed by the memory sub-system controller 115 of FIG. 1 based on the queue identifier-based write processor 113. Additionally, or alternatively, for some embodiments, at least one of the methods 500, 600 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Referring now to the method 500 of FIG. 5, the method 500 illustrates an example of deferring write requests based on queue identifiers associated with the write requests, in accordance with some embodiments.

At operation 502, a processing device (e.g., the processor 117 of the memory sub-system controller 115) receives a set of command requests from a host system (e.g., 120), where each individual command request in the set of command requests is stored to an individual submission queue of a memory system (e.g., the memory sub-system 110) associated with (e.g., that corresponds to) an individual queue identifier of the individual command request. For some embodiments, a command request received from the host system comprises a queue identifier (e.g., includes a QID tag) associated with the command request (e.g., based on the host-side submission queue from which the command request was sent).

Eventually, at operation 504, the processing device (e.g., the processor 117) scans one or more submission queues (e.g., scan each submission queue) of the memory system (e.g., the memory sub-system 110) for command requests to be executed. While scanning a given submission, the processing device can determine (e.g., detect) whether a next command request obtained (e.g., retrieved) from the given submission queue is a write request or a read request. In doing so, the processing device can scan for one or more commands coming from various submission queues for coalescing and processing purposes. The scanning of operation 504 is configured to cause any read requests detected from the one or more submission queues to start immediate processing (e.g., execution, command merging, etc.) at operation 520, and cause execution of any write requests detected from the one or more submission queues to be deferred for processing (e.g., parked for deferred processing, such as execution, command merging, etc.) and designated as deferred write requests at operation 522. During operation 520, the processing device can cause a detected read request (e.g., associated with a read stream) to be processed for immediate or coalesced-based execution. For some embodiments, causing execution of any write requests to be deferred for processing (e.g., execution, command merge, etc.) and designated as deferred write requests comprises the processing device determining a select queue identifier of a select write request detected from the one or more submission queues, and adding the select write request to a list of deferred (e.g., parked) write requests, where the list is associated with the select queue identifier of the select write request.

During operation 506, the processing device (e.g., the processor 117) determines whether a set of conditions is satisfied for executing deferred write requests associated with a single queue identifier. For some embodiments, determining whether the set of conditions is satisfied for executing deferred write requests associated with the single queue identifier comprises the processing device determining whether a monitored time associated with (e.g., a timer) a list of deferred write requests associated with the single queue identifier has expired. Alternatively, for some embodiments, determining whether the set of conditions is satisfied for executing deferred write requests associated with the single queue identifier comprises the processing device determining whether a number of write requests, in a list of deferred write requests associated with the single queue identifier, surpasses a threshold number of write requests.

At decision point 508, if it is determined that the set of conditions is satisfied, the method 500 proceeds to operation 510. For some embodiments, if it is determined that the set of conditions is not satisfied, the method 500 can return to operation 504 when the next scan of submission queues is to be performed.

For operation 510, the processing device (e.g., the processor 117) causes at least some portion (e.g., all) of the deferred write requests associated with the single queue identifier to be executed. For some embodiments, causing at least some portion of the deferred write requests associated with the single queue identifier to be executed comprises the processing device causing at least one write request (e.g., all write requests) in the list of deferred write requests to be executed. For some embodiments, the processing device causes a write request (e.g., a deferred write request from a list) to be executed such that a queue identifier, associated with the write request, is stored on the memory device (e.g., 130, 140) in association with data written to a set of blocks of the memory device by the write request. This inclusion of the queue identifier can enable or facilitate garbage collection based on queue identifiers in accordance with various embodiments described herein. Additionally, where a memory device (e.g., 130, 140) comprises a plurality of superblocks that each comprise a plurality of blocks, the processing device can cause a plurality of write requests (e.g., from the list of deferred write requests) to be executed such that data is written, by the plurality of deferred write requests, to one or more superblocks in sequential configuration (e.g., organizational arrangement), such as a page stripe basis, a superblock basis, a physical-to-logical (P2L) layer basis, or on a 1/Nth deck basis.

Eventually, at operation 512, the processing device (e.g., the processor 117) performs garbage collection on one or more blocks (e.g., superblocks) of the memory device (e.g., 130, 140) based on queue identifiers (e.g., stored in association with data written to the one or more blocks during operation 510). In doing so, the processing device can perform queue identifier-conditioned garbage collection. FIG. 6 illustrates an example of how garbage collection can be performed during operation 512.

Referring now to the method 600 of FIG. 6, the method 600 illustrates an example of performing garbage collection based on queue identifiers of write requests, in accordance with some embodiments. At operation 602, a processing device (e.g., the processor 117 of the memory sub-system controller 115) causes a write request (e.g., a deferred write request from a list) to be executed such that a queue identifier, associated with the write request, is stored on a memory device (e.g., 130, 140) in association with data written to a set of blocks of the memory device by the write request. Depending on the embodiment, a queue identifier can be stored on the memory device in association with data written to the set of blocks by including the queue identifier in metadata associated with the data written to the set of blocks, by storing the queue identifier in a separate (e.g., reserved) area of the memory device.

At operation 604, the processing device (e.g., the processor 117) performs on one or more select blocks of the memory device (e.g., 130, 140) based on queue identifiers stored on the memory device in association with the one or more select blocks. During operation 604, the processing device (e.g., the processor 117) performs one or more of operations 620, 622, 624, 626, 628. At operation 620, the processing device determines (e.g., generates) one or more lists of memory units (e.g., blocks or pages) from the one or more select blocks, where each list of the one or more lists is associated with a different queue identifier and comprises memory units (e.g., pages or blocks) storing valid data associated with the different queue identifier. Thereafter, at operation 622, the processing device (e.g., the processor 117) determines a longest list of memory units (e.g., blocks or pages) from the one or more lists of memory units determined at operation 620. Then, at operation 624, the processing device (e.g., the processor 117) performs a garbage collection operation on at least some portion (e.g., all) of the longest list of memory units. For some embodiments, valid data from memory units of the longest list is migrated to a collection of destination memory units (e.g., pages of a destination superblock) until the collection of destination memory units is full or there are no more memory units from the longest list left to migrate valid data from. If at operation 626, the processing device (e.g., the processor 117) determines that a collection of destination blocks (e.g., destination superblock) is not full, the method 600 proceeds to operation 628, where a next longest list of memory units is determined (e.g., identified) and the method 600 returns to operation 624. If, however, the processing device (e.g., the processor 117) determines that a collection of destination memory units (e.g., pages of a destination superblock) is full, the method 600 can proceed to operation 606, where the garbage collection on the one or more select blocks ends.

Figure 7:
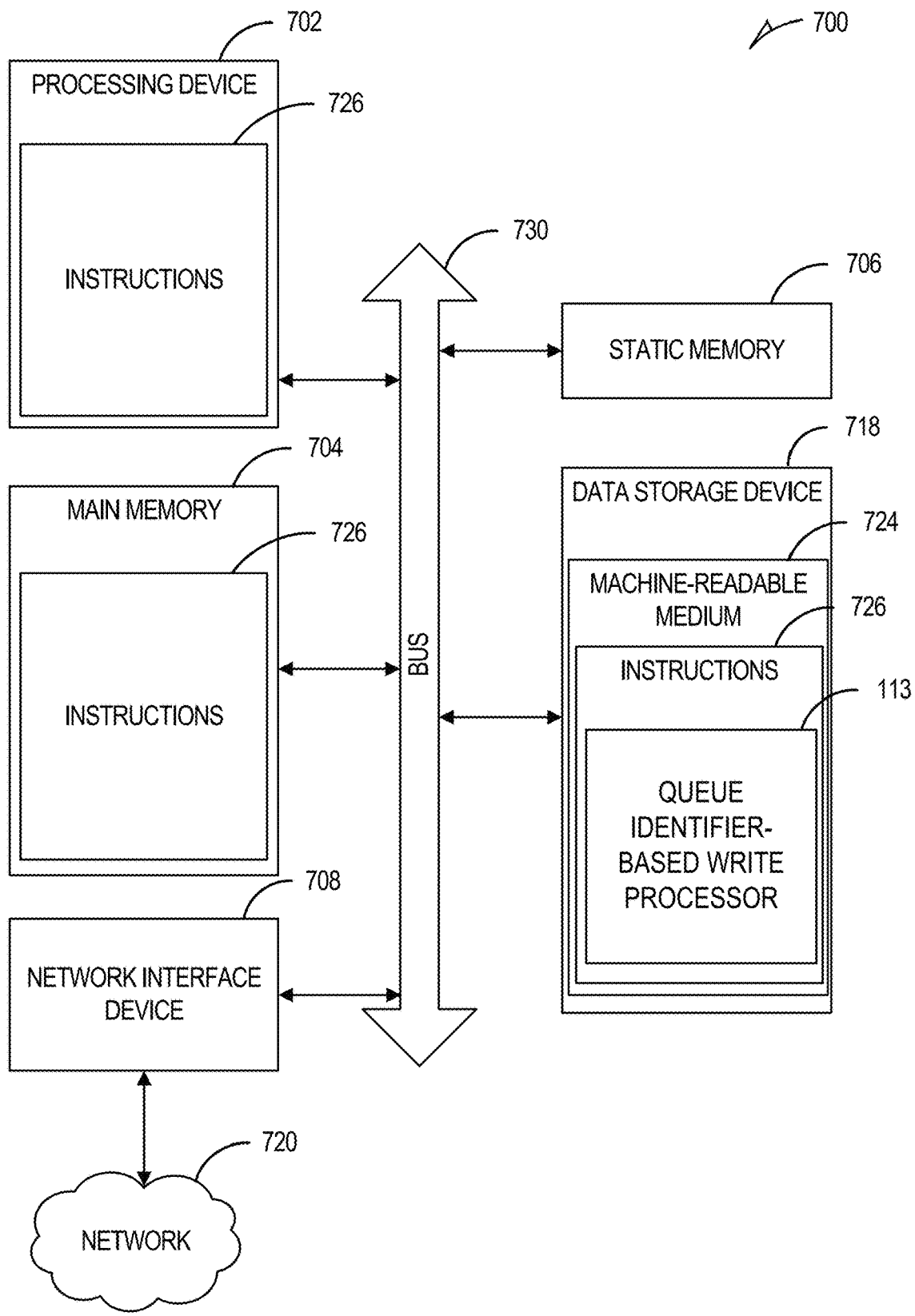
FIG. 7 is a block diagram of an example computer system in which embodiments of the present disclosure may operate.

FIG. 7 illustrates an example machine in the form of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., ROM, flash memory, DRAM such as SDRAM or Rambus DRAM (RDRAM), etc.), a static memory 706 (e.g., flash memory, static random access memory (SRAM), etc.), and a data storage device 718, which communicate with each other via a bus 730.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an application-specific integrated circuit (ASIC), a field programmable gate array (FPGA), a digital signal processor (DSP), a network processor, or the like. The processing device 702 is configured to execute instructions 726 for performing the operations and steps discussed herein. The computer system 700 can further include a network interface device 708 to communicate over a network 720.

The data storage device 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage device 718, and/or main memory 704 can correspond to the memory sub-system 110 of FIG. 1.

In one embodiment, the instructions 726 include instructions to implement functionality corresponding to processing write requests based on queue identifiers associated with the write requests as described herein (e.g., the queue identifier-based write processor 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMs, EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium (e.g., non-transitory machine-readable medium) having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a plurality of submission queues, each submission queue of the plurality of submission queues being associated with a corresponding queue identifier, each queue identifier being associated with at least one hardware processor core of a host system;
a memory device; and
a processing device, operatively coupled to the memory device, configured to perform operations comprising:
receiving a set of command requests from the host system, each individual command request in the set of command requests including an individual queue identifier and being stored to an individual submission queue of the plurality of submission queues associated with the individual queue identifier;
scanning one or more submission queues of the plurality of submission queues for command requests to be executed, the scanning being configured to cause execution of any write requests detected from the one or more submission queues to be deferred for processing and designated as deferred write requests;
determining whether a set of conditions is satisfied for executing deferred write requests associated with a single queue identifier; and in response to determining that the set of conditions is satisfied for executing the deferred write requests associated with the single queue identifier, causing at least some portion of the deferred write requests associated with the single queue identifier to be executed.

2. The system of claim 1, wherein the causing of execution of any write requests detected from the one or more submission queues to be deferred for processing and designated as deferred write requests comprises:

determining a select queue identifier of a select write request detected from the one or more submission queues; and adding the select write request to a list of deferred write requests, the list being associated with the select queue identifier.

3. The system of claim 2, wherein the determining of whether the set of conditions is satisfied for executing deferred write requests associated with the single queue identifier comprises:

determining whether a monitored time associated with a list of deferred write requests associated with the single queue identifier has expired, the causing of the at least some portion of the deferred write requests associated with the single queue identifier to be executed comprising causing at least one write request in the list of deferred write requests to be executed.

4. The system of claim 2, wherein the determining of whether the set of conditions is satisfied for executing deferred write requests associated with the single queue identifier comprises:

determining whether a number of write requests, in a list of deferred write requests associated with the single queue identifier, surpasses a threshold number of write requests, the causing of the at least some portion of the deferred write requests associated with the single queue identifier to be executed comprising causing at least one write request in the list of deferred write requests to be executed.

5. The system of claim 1, wherein the memory device comprises a plurality of superblocks, wherein each superblock comprises a plurality of blocks, and wherein the causing of the at least some portion of the deferred write requests associated with the single queue identifier to be executed comprises:

causing a plurality of deferred write requests associated with the single queue identifier to be executed such that data is written, by the plurality of deferred write requests, to one or more superblocks on a page stripe basis.

6. The system of claim 1, wherein the memory device comprises a plurality of superblocks, wherein each superblock comprises a plurality of blocks, and wherein the causing of the at least some portion of the deferred write requests associated with the single queue identifier to be executed comprises:

causing a plurality of deferred write requests associated with the single queue identifier to be executed such that data is written, by the plurality of deferred write requests, to one or more superblocks on a superblock basis.

7. The system of claim 1, wherein the memory device comprises a plurality of superblocks, wherein each superblock comprises a plurality of blocks, and wherein the causing of the at least some portion of the deferred write requests associated with the single queue identifier to be executed comprises:

causing a plurality of deferred write requests associated with the single queue identifier to be executed such that data is written, by the plurality of deferred write requests, to one or more superblocks on a 1/Nth deck basis.

8. The system of claim 1, wherein the memory device comprises a plurality of superblocks, wherein each superblock comprises a plurality of blocks, and wherein the causing of the at least some portion of the deferred write requests associated with the single queue identifier to be executed comprises:

causing a plurality of deferred write requests associated with the single queue identifier to be executed such that data is written, by the plurality of deferred write requests, to one or more superblocks on a physical-to-logical layer basis.

9. The system of claim 1, wherein the causing of the at least some portion of the deferred write requests associated with the single queue identifier to be executed comprises:

causing a single deferred write request to be executed such that a single queue identifier, associated with the single deferred write request, is stored on the memory device in association with data written to a set of blocks of the memory device by the single deferred write request; and wherein the operations comprise:

performing garbage collection on one or more select blocks of the memory device based on queue identifiers stored on the memory device in association with the one or more select blocks.

10. The system of claim 9, wherein the single queue identifier is stored on the memory device in association with the data written to the set of blocks by including the single queue identifier in metadata associated with the data written to the set of blocks.

11. The system of claim 9, wherein the performing of garbage collection on the one or more select blocks based on queue identifiers stored on the memory device in association with the one or more select blocks comprises:

determining one or more lists of memory units from the one or more select blocks, each list of the one or more lists being associated with a different queue identifier and comprising memory units storing valid data associated with the different queue identifier;

determining a longest list of memory units from the one or more lists of memory units; and performing a garbage collection operation on at least some portion of the longest list of memory units.

12. The system of claim 1, wherein the memory device comprises a plurality of superblocks, wherein each superblock comprises a plurality of blocks, and wherein the causing of the at least some portion of the deferred write requests associated with the single queue identifier to be executed comprises:

causing a single deferred write request to be executed such that a single queue identifier, associated with the single deferred write request, is stored on the memory device in association with data written to a set of blocks of the memory device by the single deferred write request; and wherein operations comprise:

performing garbage collection on one or more superblocks of the memory device, the performing of garbage collection on the one or more superblocks comprising:

determining one or more lists of memory units from the one or more superblocks, each list of the one or more lists being associated with a different queue identifier and comprising memory units of valid data associated with the different queue identifier;

determining a longest list of memory units from the one or more lists of memory units; and performing a garbage collection operation on at least some portion of the longest list of memory units such that data from blocks in the longest list is migrated to a destination superblock.

13. The system of claim 12, wherein the longest list is a first longest list, and wherein the performing of garbage collection on the one or more superblocks comprises:

in response to determining that the destination superblock is not full after data from all blocks in the first longest list is migrated to the destination superblock:

determining a second longest list of memory units from the one or more lists of memory units; and performing the garbage collection operation on at least some portion of the second longest list of memory units such that data from blocks in the second longest list is migrated to the destination superblock until the destination superblock is filled or there are no more memory units left to migrate.

14. The system of claim 12, wherein the scanning is configured to cause any read requests detected from the one or more submission queues to start immediate processing.

15. At least one non-transitory machine-readable storage medium comprising instructions that, when executed by a processing device of a memory sub-system, cause the processing device to perform operations comprising:

receiving a set of command requests from a host system, the memory sub-system comprising a plurality of submission queues, each submission queue of the plurality of submission queues associated with a corresponding queue identifier, each queue identifier being associated with at least one hardware processor core of a host system, each individual command request in the set of command requests including an individual queue identifier and being stored to an individual submission queue of the plurality of submission queues associated with the individual queue identifier;

scanning one or more submission queues of the plurality of submission queues for command requests to be executed, the scanning being configured to cause execution of any write requests detected from the one or more submission queues to be deferred for processing and designated as deferred write requests;

determining whether a set of conditions is satisfied for executing deferred write requests associated with a single queue identifier; and in response to determining that the set of conditions is satisfied for executing the deferred write requests associated with the single queue identifier, causing at least some portion of the deferred write requests associated with the single queue identifier to be executed.

16. The at least one non-transitory machine-readable storage medium of claim 15, wherein the causing of execution of any write requests detected from the one or more submission queues to be deferred for processing and designated as deferred write requests comprises:

determining a select queue identifier of a select write request detected from the one or more submission queues; and adding the select write request to a list of deferred write requests, the list being associated with the select queue identifier.

17. The at least one non-transitory machine-readable storage medium of claim 16, wherein the determining of whether the set of conditions is satisfied for executing deferred write requests associated with the single queue identifier comprises:

determining whether a monitored time associated with a list of deferred write requests associated with the single queue identifier has expired, the causing of the at least some portion of the deferred write requests associated with the single queue identifier to be executed comprising causing at least one write request in the list of deferred write requests to be executed.

18. The at least one non-transitory machine-readable storage medium of claim 16, wherein the determining of whether the set of conditions is satisfied for executing deferred write requests associated with the single queue identifier comprises:

determining whether a number of write requests, in a list of deferred write requests associated with the single queue identifier, surpasses a threshold number of write requests, the causing of the at least some portion of the deferred write requests associated with the single queue identifier to be executed comprising causing at least one write request in the list of deferred write requests to be executed.

19. The at least one non-transitory machine-readable storage medium of claim 15, wherein the causing of the at least some portion of the deferred write requests associated with the single queue identifier to be executed comprises:

causing a single deferred write request to be executed such that a single queue identifier, associated with the single deferred write request, is stored on the memory device in association with data written to a set of blocks of the memory device by the single deferred write request; and performing garbage collection on one or more select blocks of the memory device based on queue identifiers stored on the memory device in association with the one or more select blocks.

20. A method comprising:

receiving, at a memory sub-system, a set of command requests from a host system, the memory sub-system comprising a plurality of submission, each submission queue of the plurality of submission queues being associated with a corresponding queue identifier, each queue identifier being associated with at least one hardware processor core of a host system, each individual command request in the set of command requests including an individual queue identifier and being stored to an individual submission queue of the plurality of submission queues associated with the individual queue identifier;

scanning, by a processing device, one or more submission queues of the plurality of submission queues for command requests to be executed, the scanning being configured to cause execution of any write requests detected from the one or more submission queues to be deferred for processing and designated as deferred write requests;

determining, by the processing device, that a set of conditions is satisfied for executing deferred write requests associated with a single queue identifier; and in response to determining that the set of conditions is satisfied for executing the deferred write requests associated with the single queue identifier, causing, by the processing device, at least some portion of the deferred write requests associated with the single queue identifier to be executed.

\* \* \* \* \*